US011137493B2

(12) United States Patent
Flores Tapia et al.

(10) Patent No.: US 11,137,493 B2
(45) Date of Patent: Oct. 5, 2021

(54) SYSTEM AND METHOD FOR DETECTING PRECIPITATION USING RADAR

(71) Applicant: GM GLOBAL TECHNOLOGY OPERATIONS LLC, Detroit, MI (US)

(72) Inventors: Daniel Flores Tapia, Auburn Hills, MI (US); Stephen W. Decker, Clarkston, MI (US); Stephen W. Erskine, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 445 days.

(21) Appl. No.: 16/160,066

(22) Filed: Oct. 15, 2018

(65) Prior Publication Data

US 2020/0116857 A1    Apr. 16, 2020

(51) Int. Cl.
*G01S 13/95* (2006.01)
*B60S 1/02* (2006.01)
*B60S 1/08* (2006.01)

(52) U.S. Cl.
CPC ............. *G01S 13/951* (2013.01); *B60S 1/023* (2013.01); *B60S 1/0859* (2013.01)

(58) Field of Classification Search
None
See application file for complete search history.

(56) References Cited

U.S. PATENT DOCUMENTS

| 4,835,536 | A  | * | 5/1989  | Piesinger ............... | G01S 7/292 |
|           |    |   |         |                          | 342/26 D   |
| 2003/0169198 | A1 | * | 9/2003  | Hofmann .............. | G01S 7/4004 |
|           |    |   |         |                          | 342/173    |
| 2005/0272159 | A1 | * | 12/2005 | Ismagilov ............. | B01F 5/0647 |
|           |    |   |         |                          | 436/34     |
| 2012/0032840 | A1 | * | 2/2012  | Heilmann ............... | G01S 13/95 |
|           |    |   |         |                          | 342/26 R   |
| 2012/0242544 | A1 | * | 9/2012  | Gopalsami ............... | G01T 7/00  |
|           |    |   |         |                          | 342/460    |
| 2015/0094908 | A1 | * | 4/2015  | Hirota ................... | B60S 1/0833 |
|           |    |   |         |                          | 701/36     |
| 2020/0049751 | A1 | * | 2/2020  | Salazar Cerreno .... | H01Q 1/422 |

(Continued)

FOREIGN PATENT DOCUMENTS

CN    1491840  A  *  4/2004
DE    4123641  A1 *  1/1993  ............ B60S 1/0818

*Primary Examiner* — Kelly D Williams
(74) *Attorney, Agent, or Firm* — Cantor Colburn LLP

(57) ABSTRACT

A system and method for sensing precipitation conditions near a vehicle. The precipitation radar system is mounted on the vehicle and includes a transmitter, a receiver, and an electronic control unit. The method transmits radar signals from the transmitter; receives reflected radar signals at the receiver; determines response information from the reflected radar signals for a region of interest; and uses the response information to determine precipitation conditions for the region of interest. The region of interest is defined, at least in part, by a range and the response information includes phase data, amplitude data, or both phase and amplitude data based on the reflected radar signals. The method and system may then use the precipitation conditions to control other responsive vehicle actions, such as activating a windshield heater, a windshield defroster, a windshield wiper or a combination thereof.

18 Claims, 3 Drawing Sheets

(56) References Cited

U.S. PATENT DOCUMENTS

2020/0086831 A1\* 3/2020 Ji .................... G01N 27/048
2020/0271778 A1\* 8/2020 Moreau ............... G01S 13/95
2020/0301008 A1\* 9/2020 Hayano .............. G01S 7/025

\* cited by examiner

SYSTEM AND METHOD FOR DETECTING PRECIPITATION USING RADAR

TECHNICAL FIELD

The present invention relates generally to radar systems, and more particularly, to vehicle-mounted radar systems that detect precipitation using radar.

BACKGROUND

Many vehicles include precipitation detectors that can be used to detect the presence of precipitation at the vehicle, such as on a windshield. In some instances, conventional precipitation detectors direct infrared light toward a windshield from a first end and then measure an intensity of light received at a second end. The amount of precipitation can be detected based on the measured intensity of light received, but this type of precipitation detection has its disadvantages. For example, this type of detection only works for detecting precipitation on a transparent surface, such as a windshield. Additionally, the measured intensity of light is only informative of an approximate level of precipitation (e.g., no precipitation, low-to-medium precipitation, and medium-to-high precipitation).

SUMMARY

According to one aspect, there is provided a method of sensing precipitation conditions near a vehicle using a precipitation radar system that includes a transmitter, a receiver, and an electronic control unit, the method including: transmitting radar signals from the transmitter; receiving reflected radar signals at the receiver; determining response information from the reflected radar signals for a region of interest, wherein the region of interest is defined at least in part by a range and the response information includes phase data, amplitude data, or both phase and amplitude data based on the reflected radar signals; and using the response information to determine precipitation conditions for the region of interest.

According to various embodiments, this method may further include any one of the following features or any technically-feasible combination of some or all of these features:

- carrying out a responsive vehicle action in response to the determination of the precipitation conditions for the region of interest;
- the using step includes determining an average dielectric property value for the region of interest and, then, using the average dielectric property value to determine the precipitation conditions for the region of interest;
- the average dielectric property value is determined based on the phase data, the amplitude data, or both the phase and amplitude data;
- the using step further includes identifying a precipitation type contained within the region of interest based on the average dielectric property value;
- the using step further includes determining a precipitation density of precipitation within the region of interest;
- the using step further includes determining whether the precipitation type is solid and, when it is determined that the precipitation type is solid, then determining a precipitation thickness of the precipitation within the region of interest;
- the region of interest includes a surface of the vehicle;
- determining a responsive vehicle action based on the precipitation thickness, the precipitation density, or both the precipitation thickness and the precipitation density within the region of interest, and wherein the responsive vehicle action includes a vehicle action to remove the precipitation from the surface of the vehicle;
- the surface of the vehicle is a windshield and wherein the responsive vehicle action includes activating a windshield heater, a windshield defroster, a windshield wiper or a combination thereof;
- the windshield heater, the windshield defroster, the windshield wiper or the combination thereof is activated at a level of operation that is selected based on the precipitation thickness, the precipitation density, or both the precipitation thickness and the precipitation density;
- the determination of response information includes filtering the reflected radar signals based on frequency to obtain frequency-filtered reflected radar signals;
- the determination of response information includes filtering the frequency-filtered reflected radar signals for the region of interest based on time, the range, or both time and the range to obtain the response information for the region of interest;
- the region of interest is external to and spaced away from the vehicle;
- the precipitation radar system is installed on the vehicle behind an opaque surface such that the precipitation radar system is hidden from view;
- the precipitation radar system is installed behind a fascia or bumper of the vehicle or on the roof of the vehicle;
- the method is carried out a plurality of times for a plurality of regions of interest, and wherein the plurality of regions of interest include the region of interest; and/or
- determining a responsive vehicle action based on determining the precipitation conditions for the plurality of regions of interest.

According to another aspect, there is provided a precipitation radar system for a vehicle, the precipitation radar system including: a transmitter including one or more transmitter antennas; a receiver including one or more receiver antennas; and a processor and memory, the memory including computer instructions; wherein the computer instructions, when executed by the processor, cause the precipitation radar system to: (i) transmit radar signals from the transmitter using the transmitter antennas; (ii) receive reflected radar signals at the receiver using the receiver antennas; (iii) determine response information from the reflected radar signals for a region of interest, wherein the region of interest is defined at least in part by a range and the response information includes phase data, amplitude data, or both phase and amplitude data based on the reflected radar signals; and (iv) use the response information to determine precipitation conditions for the region of interest.

According to one embodiment, this precipitation radar system is installed on the vehicle behind an opaque surface such that the precipitation radar system is hidden from view.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENT(S)

Figure 1:
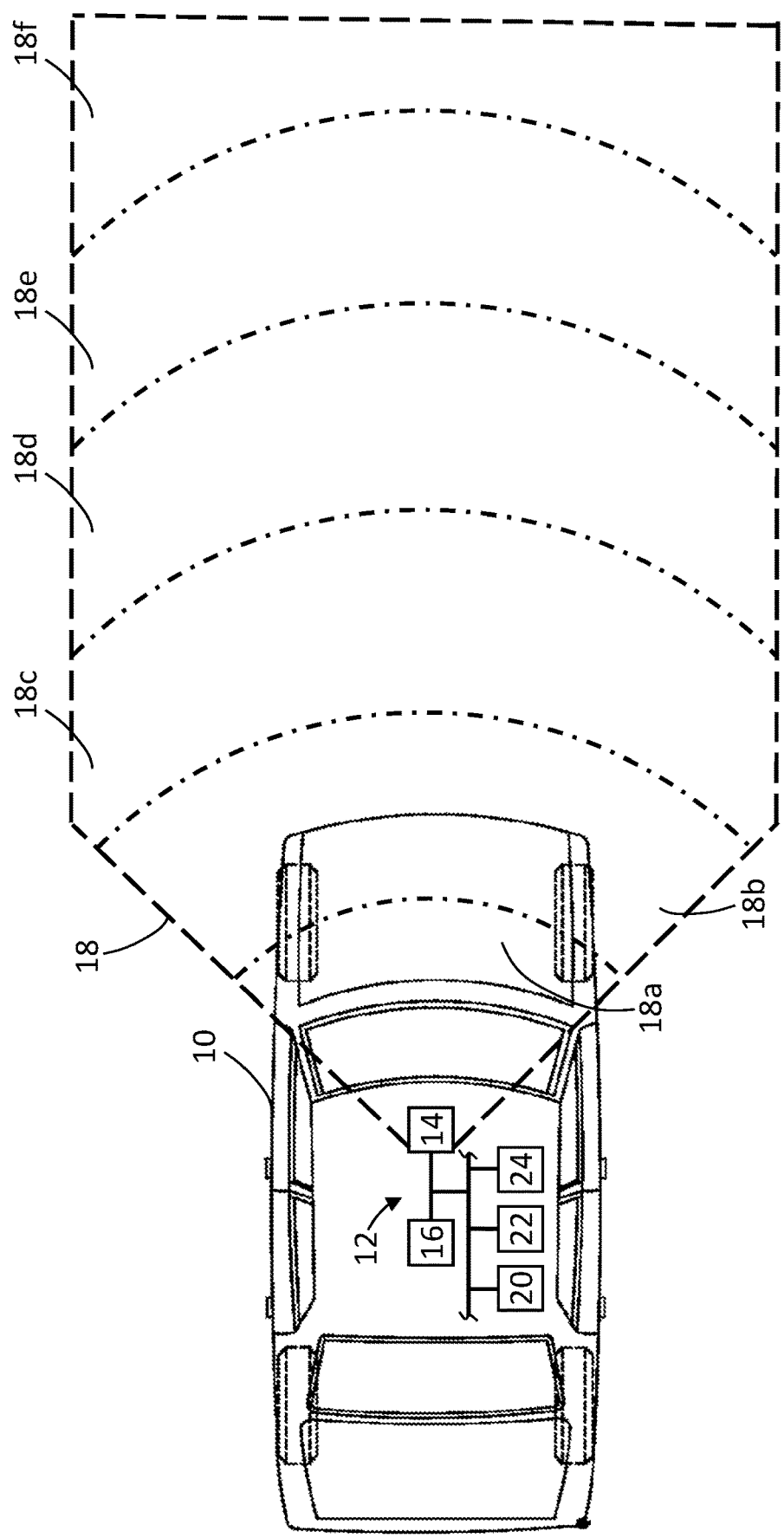
FIG. 1 is a schematic block diagram of a host vehicle that includes an example of a precipitation radar system.

The precipitation radar system and method described herein provide for sensing environmental conditions, including, for example, classification of precipitation type, determination of precipitation thickness, and determination of precipitation density. In general, the precipitation radar system includes a transmitter, a receiver, and an electronic control unit. The precipitation radar system transmits radar signals using the transmitter and then receives reflected radar signals at the receiver. The reflected radar signals can be processed to obtain response information for a particular region of interest. As an example, the region of interest can correspond to an area or volume that includes a surface of a vehicle component (e.g., a surface of the windshield, the hood, headlight covers) and/or one that is located away from the vehicle (e.g., a volume ranging from 10 to 20 meters in front of the vehicle that is 10 meters high and 10 meters wide). In one embodiment, the response information includes phase and/or amplitude data that is based on the reflected radar signals. Once the response information for the region of interest is obtained, a dielectric property value for the region of interest can be obtained.

In one embodiment, once the dielectric property value for the region of interest is obtained, precipitation information can be determined, which can include a precipitation type, a precipitation thickness, and/or a precipitation density. For example, a first precipitation type can be rain, a second precipitation type can be snow, a third precipitation type can be ice, and a fourth precipitation type can be fog. Additionally or alternatively, a precipitation density can be determined based on the dielectric property value. And, in the case that the precipitation type is a solid (e.g., snow or ice), a precipitation thickness can be determined, which can be useful in the case where the region of interest includes a surface of the vehicle, such as a windshield or hood of the vehicle. Based on these determinations, the vehicle can then carry out one or more responsive vehicle actions, such as activating a heater to heat the windshield or activating windshield wipers. It should be appreciated that, although the precipitation radar system is described herein as detecting precipitation, in some embodiments, other environmental conditions can be detected using the precipitation radar sensor.

Using radar signals enables the system to obtain information of a particular region that may not be within a line of sight of the radar transmitter and receiver and, thus, the radar can be mounted behind opaque (or non-transparent) surfaces. For example, in a vehicular application, the precipitation radar system can be mounted behind a front fascia of the vehicle, a front or rear bumper of the vehicle, a grille of the vehicle, a hood of the vehicle, a windshield wiper cowl cover, a dashboard panel, a headlight or headlight cover, a radio antenna housing (e.g., a shark fin provided on the roof of the vehicle), a trunk of the vehicle, a door of the vehicle, etc. Thus, in some embodiments, the precipitation radar system can be installed such that it is hidden from view. Moreover, through use of radar signals, more accurate information regarding the environment and, particularly, precipitation, can be determined and used for informing vehicle operation.

FIG. 1 illustrates one possible architecture for a precipitation radar system 12 that can be used to implement the disclosed method. While the approach and methodology described herein relate to the radar configuration shown in FIGS. 1 and 2, one of ordinary skill in the art will appreciate that precipitation radar system 12 is merely one example, and in many ways, the schematic block diagrams of these figures have been simplified for ease of explanation. Other configurations and embodiments may certainly be used instead, as the precipitation radar system and method described herein represent just one possible example. Moreover, the precipitation radar system can be incorporated into many other systems or devices, as the vehicular application of the precipitation radar system 12 is merely but one example.

In the illustrated embodiment, vehicle 10 includes the precipitation radar system 12 and vehicle system modules (VSMs) 20-24. The precipitation radar system 12 includes the radar 14 and the electronic control unit 16. The radar 14 can be used to transmit radar signals toward a sensor field-of-view 18 and then receive reflected radar signals. The received radar signals can be processed by the radar 14 to obtain response information concerning one or more regions of interest that are included within the sensor field-of-view 18. As described in more detail below, the radar 14 can determine information concerning precipitation within the region of interest and then send this information to the electronic control unit 16. The electronic control unit 16 can then carry out a responsive vehicle action, which can include sending control signals to one or more of the VSMs 20-24.

Although the radar 14 is illustrated in the drawings as being mounted on the top (or roof) of the vehicle and pointed in the vehicle forward direction, this is not necessary. For instance, the radar 14 could be mounted at a location other than on the top of the vehicle, it may include a different number of transmit and/or receive antennas, and it could be oriented in a different direction. In one embodiment, the radar 14 can be mounted on the top or roof of the vehicle, which can be included within a shark fin that houses other electromagnetic antennas. In another embodiment, the radar 14 can be mounted under a fascia of the vehicle, such as behind the front bumper or the grille of the vehicle.

The radar 14 and the electronic control unit 16 are depicted as being a part of different vehicle system modules; however, in other embodiments, the radar 14 and the electronic control unit 16 can be incorporated into a single vehicle system module. The radar generally includes a transmitter and a receiver, which is discussed below with respect to FIG. 2. Also, the radar 14 and/or the electronic control unit 16 include a processor and memory, which can store computer instructions that, when executed by the processor, cause the method described herein to be carried out. The processor of the radar 14 and/or the electronic control unit 16 can be any type of device capable of processing electronic instructions including microprocessors, microcontrollers, host processors, controllers, vehicle communication processors, GPU (General Processing Unit), Accelerators, FPGA (Field Programmable Gated Arrays), other processors, and application specific integrated circuits (ASICs). The memory of the radar 14 and/or the electronic control unit 16 can be a non-transitory computer-readable medium or other type of memory, such as a powered temporary memory or any suitable non-transitory, computer-readable medium; these include different types of RAM (random-access memory, including various types of dynamic RAM (DRAM) and static RAM (SRAM)), ROM (read-only memory), solid-state drives (SSDs) (including other solid-state storage such as solid state hybrid drives (SSHDs)), hard disk drives (HDDs), and magnetic or optical disc drives. As mentioned above, in some embodiments where the radar 14 and the electronic control unit 16 are incorporated into a single vehicle system module, the radar 14 and the electronic control unit 16 can share one or more processors and memory.

Depending on the particular embodiment, the radar 14 and/or the electronic control unit 16 may be a stand-alone vehicle electronic module, it may be incorporated or included within another vehicle electronic module (e.g., a steering control module, brake control module), or it may be part of a larger network or system (e.g., autonomous driving system, a traction control system (TCS), electronic stability control (ESC) system, antilock brake system (ABS), driver assistance system, adaptive cruise control system, lane departure warning system), to name a few possibilities. Such a control module is not limited to any one particular embodiment or arrangement. In some embodiments, the precipitation radar system discussed herein is incorporated into a vehicle electronics system for use with autonomous and/or semi-autonomous vehicle operations. In one embodiment, the electronic control unit 16 can be used for carrying out autonomous vehicle functionality or logic. The precipitation classification and/or measurements that are made by the method discussed herein can be used as input into an autonomous or semi-autonomous vehicle module, which can be electronic control unit 16 in some embodiments. For example, in one scenario, when the precipitation radar system 12 detects ice over the roadway that is in front of the vehicle, an electronic stability program can be activated or otherwise informed of the roadway conditions.

Figure 3:
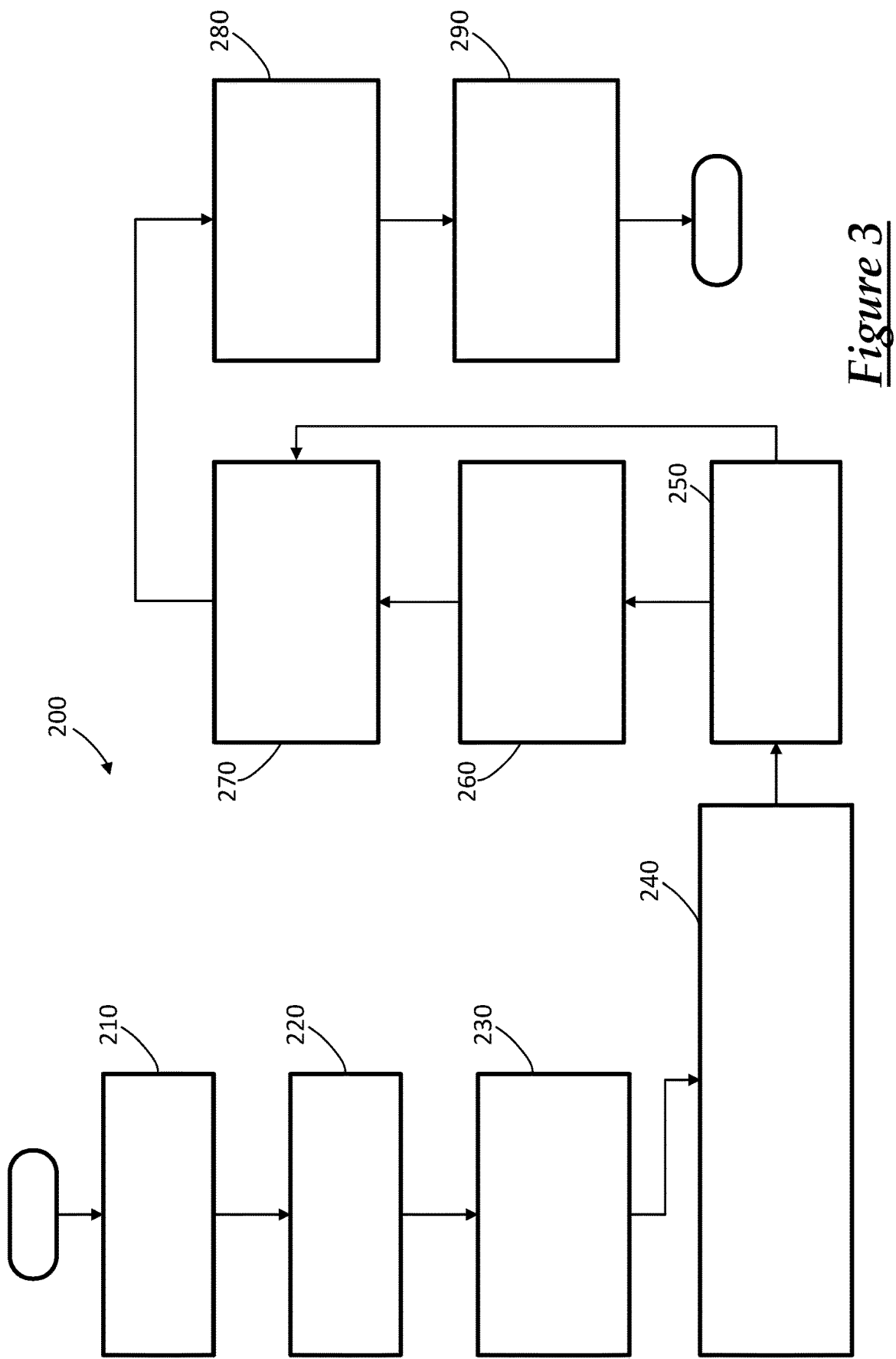
FIG. 3 is a flow chart depicting an example of a method for sensing precipitation conditions near a vehicle using a precipitation radar system.

The radar 14 can be directly connected to the electronic control unit 16 (as depicted in FIG. 1); however, in other embodiments, the radar 14 and the electronic control unit 16 can communicate using the communications bus. In one embodiment, the electronic control unit 16 can send commands or instructions to the radar 14 that instruct the radar 14 to carry out one or more operations, such as the method described herein. The radar 14 can send information to the electronic control unit 16, such as precipitation information that determined and/or otherwise obtained by the radar 14, as discussed below with respect to the method 200 (FIG. 3). The electronic control unit 16 can receive this precipitation information, identify a responsive vehicle action based on this precipitation information, and carry out the responsive vehicle action, which can include sending commands or instructions to other vehicle system modules (VSMs), such as VSMs 20-24.

The vehicle 10 is shown as including three exemplary VSMs 20-24 and, although only three VSMs are shown, the vehicle can include any number and/or type of VSMs as will be appreciated by those skilled in the art. A first VSM can be a heating/ventilation/air conditioning (HVAC) module 20, a second VSM can be a windshield wiper module 22, and a third VSM can be an autonomous driving control module 24. These VSMs 20-24 can be used to carry out a responsive vehicle action in response to detecting precipitation using the precipitation radar system 12. The VSMs 20-24 can be communicatively coupled to the electronic control unit 16 via the communications bus, which can be a controller area network (CAN), a media oriented system transfer (MOST), a local interconnection network (LIN), a local area network (LAN), and other appropriate connections such as Ethernet or others that conform with known ISO, SAE, and IEEE standards and specifications, to name but a few.

Figure 2:
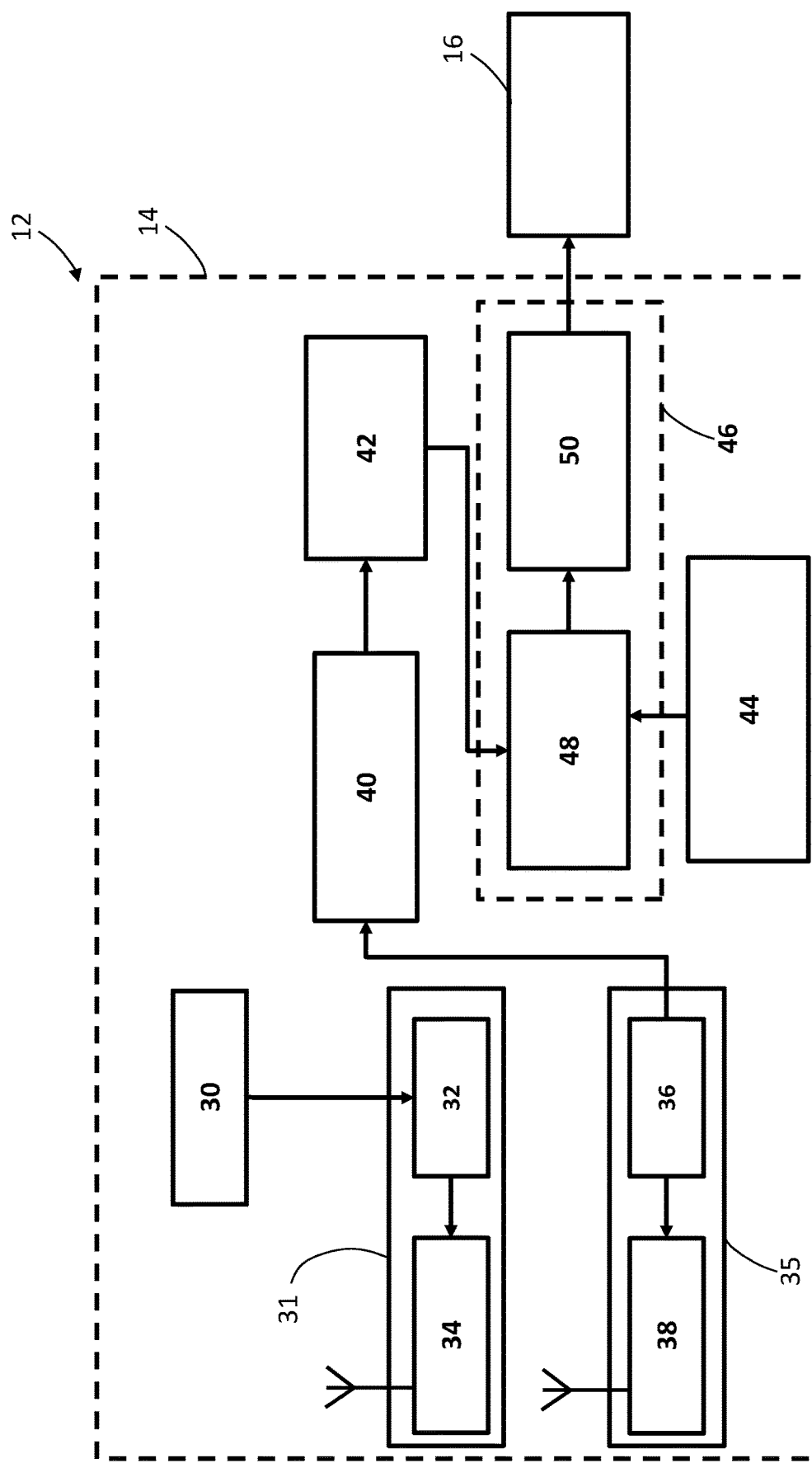
FIG. 2 is a schematic block diagram of a precipitation radar system that includes a receiver, a transmitter, and an electronic control unit.

With reference to FIG. 2, there is shown the precipitation radar system 12, which includes the radar 14 and the electronic control unit 16. The radar 14 includes a transmitter 31 and a receiver 35. The precipitation radar system 12 can include any other suitable hardware, firmware, software and/or other components that are useful for operation of such a system. According to one example, the transmitter 31 includes transmitter circuitry 32 that is communicatively coupled to one or more transmit antennas 34 and can be configured to create a sensor field-of-view 18 that monitors a particular zone of interest, which can include one or more regions of interest. The transmitter 31 is configured to use transmitter circuitry 32 and transmitter antennas 34 to generate and transmit electromagnetic signals that reflect off one or more target objects within the field-of-view 18 of the radar 14.

The transmitter 31 may be a stand-alone module or unit; it may be part of a larger module, unit, system, etc.; it may include a number of sub-modules, sub-units, sub-systems, etc.; or it may be configured according to some other arrangement or architecture so long as it is configured to generate electromagnetic signals for transmission in accordance with the method disclosed herein. In one non-limiting example, the transmitter 31 includes a baseband processor that is configured to manage radio operations, including the generation of signals for transmission using one or more transmitter antennas. The baseband processor can include hardware, firmware and/or software typically found on such transmitters, including random access memory (RAM, including static RAM (SRAM) and dynamic RAM (DRAM)) or other types of memory, including flash memory, other solid state memory, or other suitable memory. The transmitter 31 can include waveform generators, oscillators, amplifiers, mixers, combiners, filters, converters and/or processors, to name just a few possible components. By way of example only, a waveform generator may be configured to generate waveforms or signals having different pulse widths, different waveform types and/or different pulse repetition intervals (PM) within a given coherent processing interval (CPI). The waveforms or signals may then be digitized by a digital to analog (D/A) converter and up converted to a radio frequency carrier using an up converter. The up converter can consist of intermediate frequency (IF) and/or radio frequency (RF) oscillators, filters and/or synchronizing circuits. A transmit amplifier may then generate a transmit signal, which can be fed to a circulator or similar device. Again, this is only one possible configuration for transmitter 31, as numerous other configurations certainly are possible.

The receiver 35 is configured to process and extract information from the reflected radar signals or echoes. The radar signals transmitted by the transmitter 31 reflect off objects (e.g., precipitation) within the field-of-view 18 and are received as echoes or reflections by the receiver 35, which includes receiver circuitry 36 and receiver antenna(s) 38. The receiver 35 can include any number of receiver antennas and, in one embodiment, includes a plurality of receiver antennas. In a particular embodiment, the radar 14 is a multiple input multiple output (MIMO) antenna that includes a plurality of receiver antennas 38 and a plurality of transmitter antennas 34. The receiver 35 may be a stand-alone module or unit; it may be part of a larger module, unit, system, etc. (e.g., the receiver may be part of a module or unit that also includes the transmitter 31); it may include a number of sub-modules, sub-units, sub-systems, etc.; or it may be configured according to some other arrangement or architecture so long as it is configured to process electromagnetic signals received by the receiver antennas 38 in accordance with the method disclosed herein. According to a non-limiting example, the receiver 35 includes receiver circuitry 36, which can include hardware, firmware and/or or software typically found on receivers such as, without limitation, amplifiers, mixers, de-mixers, oscillators, combiners, filters, and converters. The functions performed by receiver 35 may vary, but generally include performing various filtering, amplification, conversion and digitizing functions, as well as signal processing functions like analyzing various properties of the signals and waveforms to determine information such as phase, frequency, and amplitude. As understood by those skilled in the art, the techniques used to extract this information from the signals and waveforms can vary, but may include without limitation, in-phase and quadrature analysis and frequency domain analysis using Fourier transforms. In one embodiment, the receiver 35 may also include components to perform pulse compression and clutter rejection (e.g., Doppler filtering) functions. In at least one embodiment, the transmitter 31 and/or receiver 35 includes a combination of radio receiver circuitry that is configured to carry out the signal processing functionality described herein, such as that described in method 200 (FIG. 3).

In one embodiment, the receiver 35 may include a baseband processor, such as the one discussed above with respect to transmitter 31. And, in some embodiments, the transmitter 31 and the receiver 35 can share a common baseband processor. For example, all or certain portions of the receiver 35 can be integrated into a single radar control module, along with all or certain portions of the transmitter 31. The receiver circuitry 36 can include a radio chipset that includes an integrated circuit and that is connected to or includes a processor and memory. The receiver circuitry 36 can also include certain components or circuitry configured to interface the radio chipset and circuitry with a vehicle communication system so that the radar 14 can communicate with other components, modules and/or systems located throughout the host vehicle and beyond. For example, it is possible for the radar 14 to be part of the host vehicle's electronics so that the vehicle radar system can communicate with other vehicle system modules, such as the electronic control unit 16 and/or with the VSMs 20-24 over a central vehicle communication bus.

In some embodiments, the receiver 35 can be connected to an analog to digital (A/D) converter 40 that can be used to sample information from the reflected radar signals so that this information can be used for processing. Once the reflected radar signals are sampled or otherwise converted into a digital format, these electronic signals can be processed by the region of interest filter 42. The region of interest filter 42 can be used to extract information pertaining to a particular region of interest from the reflected radar signals. For example, with reference to FIG. 1, there is shown six potential regions of interest 18a-f within the sensor field-of-view 18. The regions 18a-f depicted can be defined based on their range from the radar 14. In other embodiments, the region(s) of interest can be defined by one or more ranges, one or more azimuth angles, and/or one or more elevation angles. The region of interest filter 42 can be programmed or configured to extract information corresponding to a particular region (e.g., one or more of regions 18a-f), which can be referred to as a region of interest. In one embodiment, the region of interest filter 42 can use range (and/or angle) binning techniques or other suitable techniques as will be appreciated by those skilled in the art.

The precipitation estimator 46 is shown as including a precipitation type estimator 48 and a precipitation quantity estimator 50. The precipitation estimator 46 can use information stored in memory 44 for determining a precipitation type and/or a precipitation quantity. As used herein, the precipitation quantity can refer to a density of precipitation in a given region and/or a thickness of precipitation among a given surface or area. The precipitation estimator 46 can determine a dielectric property value for the region of interest, which can then be used to determine a precipitation type using the precipitation type estimator 48 and a precipitation quantity using the precipitation quantity estimator 50. These determinations can be made as a part of the method 200 (FIG. 3), and are discussed in more detail below.

In one embodiment, the radar 14 includes a processor and memory. The memory can store computer instructions that, when executed by the processor, can be used to carry out the functionality of the region of interest filter 42, the precipitation type estimator 48, and/or the precipitation quantity estimator 50. Also, one or more of the various components of the radar 14 can instead be included in the electronic control unit 16. And, in a particular embodiment, the radar 14 and the electronic control unit 16 can be incorporated into a single module. Moreover, in some embodiments, the transmitter antenna(s) 34 and the receiver antenna(s) 38 can be provided or at least partially extend to another area of the vehicle and/or outside a housing of the radar 14. It should be appreciated that items 40-50 do not have to be individual or separate modules or units as illustrated, but can be implemented through hardware, software, or both according to any number of different embodiments of hardware/software arrangements.

FIG. 3 illustrates a flow chart depicting an exemplary method 200 of sensing precipitation conditions near a vehicle using a precipitation radar system. As mentioned above, the precipitation radar system can include a transmitter, a receiver, and an electronic control unit. It should be understood that it is not necessary for the steps in method 200 to be performed in the particular order or sequence shown and described, and that the steps can be carried out in any technically-feasible order.

Beginning with step 210, radar signals are transmitted using the transmitter. For example, the transmitter 31 of the radar 14 can transmit one or more radar signals. The transmit signals can be generated using the transmitter circuitry 32 using those techniques described above and/or known to those skilled in the art. According to one such technique, a waveform generator in the transmitter circuitry 32 of the transmitter 31 generates one or more transmit signals in the form of a baseband signal that is centered around a carrier frequency. The transmit signals may have a bandwidth corresponding to linear frequency modulation (LFM) chirps or pulses, for example. The transmit signals can be any appropriate or suitable modulated signal or waveform for use with the precipitation radar system 12. The method 200 continues to step 220.

In step 220, reflected radar signals are received at the receiver. The transmitted radar signals (step 210) reflect (or refract) off of one or more objects (e.g., raindrops, snowflakes) within the sensor field-of-view 18 and then the reflected signal(s) are received at the receiver 35. The received signals can then be processed using the receiver circuitry 36 and, in one embodiment, the reflected radar signals are converted from the frequency domain to the time domain using a fast Fourier transform (FFT) technique.

These signals can be processed using other suitable techniques known to those skilled in the art and can be converted (or sampled) into a digital format using the analog to digital converter 40. The method 200 continues to step 230.

In step 230, response information is determined from the reflected radar signals for a particular a region of interest. As mentioned above, the region of interest can represent a volume within the sensor field-of-view 18, an area along a surface within the sensor field-of-view 18, and/or any other region within the sensor field-of-view 18. In at least one embodiment, the radar 14 uses the region of interest filter 42 to extract information from the reflected signals that pertains to a particular region of interest. In one embodiment, information identifying the region of interest ("region of interest identification information") can be preprogrammed into memory of the radar 14, such as memory 44 or other memory. Alternatively or additionally, the region of interest identification information can be received from the electronic control unit 16 at any time prior to step 230.

The response information for a particular a region of interest can be determined or extracted from the reflected radar signals using various techniques as will be appreciated by those skilled in the art. For example, information from the reflected radar signals can be separated or extracted based on range or a flight time, which is the time from when a radar signal was transmitted from the transmitter until the reflected radar signal is received at the receiver. Additionally, information from the reflected radar signals can be separated or extracted based on an azimuth angle and/or an elevation angle. For example, an angle of arrival (AoA) can be detected for the reflected radar signals and then used in determining response information for a particular region of interest. And, additionally, in at least one embodiment, Doppler filtering can be used as well.

In some embodiments, the information for the region of interest can be further processed and/or filtered to remove noise or other undesired information. For example, based on the shape and nature of the transmitted signal, the received reflected signals are converted (or demodulated) into the original baseband signal(s) and correlated with the baseline signal that was used to generate the transmitted signal(s). This received reflected signals can also be processed to eliminate the baseline sensor and platform response. For example, when the radar 14 is mounted behind a front fascia of the vehicle, which can be opaque (or non-transparent), the front fascia may cause noise to be introduced into the reflected radar signals. This noise can be filtered out from the reflected radar signals using various techniques, which can include preconfiguring the radar 14 to filter out known response patterns/information that is caused by the system in which the radar 14 is installed. Once the response information for the region of interest is determined, the method 200 continues to step 240.

In step 240, a dielectric property value is determined for the region of interest based on or using the response information. The region of interest can correspond to a volume or area and, thus, the region of interest may include many different objects, such as dust, raindrops, and air. Thus, in at least some embodiments, the dielectric property value is an average dielectric property value for the region of interest. The average dielectric property value refers to a dielectric property value representative of a number of objects with the region of interest. In at least some embodiments, the dielectric property value is calculated or otherwise determined from phase and/or amplitude information included in the response information for the region of interest. In one embodiment, the average dielectric property value can be determined by first determining a representative or average phase and/or amplitude and, then, identifying a corresponding average dielectric property value based on the representative or average phase and/or amplitude.

In at least some instances, the response information may include data (e.g., phase, amplitude data) corresponding to one or more of objects within the region of interest. This data can then be combined and used to obtain an average dielectric property value representative of the region of interest. For example, each of the peaks or amplitudes for each object can be integrated and then summed to obtain an overall value. This overall value can then be divided by the number of objects to obtain an average phase value and/or an average amplitude value. These values can then be used to determine the average dielectric property value. Additionally or alternatively, a maximum likelihood search can be used to find an average dielectric property value for the region of interest that maps to the phase and/or magnitude (or amplitude) of the response information. A model-based approach using apriori models can be performed using interpolation of measured data and model comparison to find the dielectric property values of the reflected radar signals.

In one embodiment, the memory 44 can store a dielectric property value mapping table (or other data structure) that maps a dielectric property value to a combination of range and phase, range and amplitude, or range, phase, and amplitude. Thus, the representative phase and/or amplitude for the region of interest can be used with the range to identify a particular dielectric property value, which can then be considered the average dielectric property value for that region of interest. The values of the dielectric property value mapping table can be predetermined at a time of manufacturing the vehicle. Those skilled in the art will appreciate that other techniques can be used as well. Once the dielectric property value is determined for the region of interest, the method 200 continues to step 250.

In step 250, a precipitation type is determined for the region of interest based on the dielectric property value. In at least some embodiments, this step can be carried out by the precipitation type estimator 48. In one embodiment, the memory 44 stores a precipitation type mapping table (or other data structure) that maps a given dielectric property value to a precipitation type. In some embodiments, this precipitation type mapping table can be incorporated with the dielectric property value mapping table so that a precipitation type can be directly determined based on the representative phase and/or amplitude for the region of interest, as it relates to the range. As those skilled in the art will appreciate, different dielectric property values correspond to different types of material or matter. Thus, the average dielectric property value can be used to determine a matter type or, in particular, a precipitation type, such as fog, rain, snow, or ice. As mentioned above, in some embodiments, other types of matter besides precipitation can be identified. For example, dust in the region of interest can be detected, such as may be the case when the vehicle is being driven on a dirt or unpaved road. These other non-precipitation types of matter can be detected in the same or a similar way to that described above, such as where certain dielectric property values correspond to dust (or dust clouds), however, this is optional.

Once the precipitation type is determined, it can be determined whether the precipitation type is solid or non-solid and/or whether the precipitation type is or is likely being accumulated on a surface. This determination can be made simply by determining whether the determined precipitation type is a solid material (e.g., snow, ice) and/or whether this material is detected on a surface. For example, when the dielectric property value indicates that the precipitation type is snow, then it can be determined whether this detected snow on a surface or in air (e.g., falling snow). In the case that the precipitation type is a solid and is on a surface (e.g., the windshield, the road, the hood), the method 200 continues to step 260; otherwise, the method 200 can proceed directly to step 270.

In step 260, the thickness of the precipitation within the region of interest is determined. In many embodiments, this step can be carried out by the precipitation quantity estimator 50. As mentioned above, step 260 can be carried out when it is determined that the precipitation type is solid and when the precipitation type is or is likely being accumulated on a surface. The thickness of the precipitation within the region of interest can be estimated using the response information for the region of interest. For example, a layer thickness mapping table can be used that maps dielectric properties and ranges to certain precipitation layer thicknesses. In one embodiment, this layer thickness mapping table can also take into consideration the precipitation type as determined in step 250. In another embodiment, the response information can be inspected to determine a distance in which the precipitation accumulation extends from a particular surface (e.g., a windshield, hood, road). Once a precipitation thickness is determined, one or more values representing the precipitation thickness can be stored in memory of the radar 14 or of another VSM, such as electronic control unit 16. The method 200 continues to step 270.

In step 270, a density of the precipitation within the region of interest is determined. In many embodiments, this step can be carried out by the precipitation quantity estimator 50. The precipitation density can be an actual or quantitative density value (i.e., mass per volume or spacing between objects), or can be a more genericized or qualitative density indicator, such as high density, medium density, or low density. In one embodiment, a precipitation density mapping table can be used that maps dielectric properties and ranges to certain precipitation densities. In one embodiment, this precipitation density mapping table can also take into consideration the precipitation type as determined in step 250. In another embodiment, the precipitation density can be determined based on an amount of detected objects within the region of interest along with the size of the region of interest. Moreover, in some embodiments, the size of the objects (e.g., raindrop or snowflake size) can be determined from the response information and used to determine the precipitation density. Once a precipitation density is determined, one or more values representing the precipitation density can be stored in memory of the radar 14 or of another VSM, such as electronic control unit 16. The method 200 then continues to step 280.

In step 280, a responsive vehicle action is determined. In many embodiments, this step can be carried out by the electronic control unit 16. In one embodiment, the precipitation type, precipitation thickness, and/or precipitation density can be sent from the radar 14 to the electronic control unit 16. The electronic control unit 16 can then identify or determine a particular vehicle action to carry out in response to the detected precipitation. In at least some embodiments, this responsive vehicle action can be determined based on the precipitation type, precipitation thickness, and/or precipitation density. And, in some embodiments, this responsive vehicle action can be further based on the particular region of interest and/or a type of region that the region of interest corresponds to. For example, when snow is detected in the air in front of the vehicle, the electronic control unit 16 can select or activate the windshield wipers 22. As another example, when snow is detected on the windshield with a thickness greater than or equal to a predetermined amount, then a HVAC function of the HVAC 20 can be activated to heat the windshield thereby melting the snow and, in a particular embodiment, the level or amount of heating can be selected based on the precipitation layer thickness and/or precipitation density. Then, once the thickness of the snow falls below the predetermined amount, the windshield wipers 22 can be activated to remove the melted snow from the windshield. The method 200 then continues to step 290.

In step 290, the responsive vehicle action is carried out. In one embodiment, the electronic control unit 16 can send a command or instruction to the VSM that is identified for carrying out the responsive vehicle action. For example, in the case that the electronic control unit 16 determines to activate the windshield wipers 22, the electronic control unit 16 can send a command to the windshield wipers 22 via the communications bus. The method 200 then ends at this point or can loop back for continued execution.

In some embodiments, the method 200 can be carried out for a plurality of iterations, with each iteration corresponding to one of a plurality of regions of interest. In one embodiment, the radar 14 can be informed of one or more regions of interest prior to carrying out the method 200 and, then, the method 200 can be carried out for the one or more regions of interest. For example, the steps 230 through 270 can be carried out for a plurality of regions of interest. In one particular embodiment, once the steps 230 through 270 are carried out for a plurality of regions of interest, a responsive vehicle action can be determined based on the determinations in steps 250, 260, and/or 270 for each of the plurality of regions of interest.

In one embodiment, the region(s) of interest can be selected based on one or more vehicle operating properties, such as the present speed of the vehicle. For example, the electronic control unit 16 can determine the speed of the vehicle 10, such as through receiving wheel speed information from a wheel speed sensor or through use of global navigation satellite system (GNSS) information (e.g., global positioning system (GPS) information). In a particular embodiment, the region of interest can be selected to be farther in front of the vehicle as the vehicle speed increases. And, in one embodiment, the region of interest is a region external to the vehicle and not including a surface of the vehicle.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater or different steps than that shown here. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation. In addition, the term "and/or" is to be construed as an inclusive or. As an example, the phrase "A, B, and/or C" includes: "A"; "B"; "C"; "A and B"; "A and C"; "B and C"; and "A, B, and C."

The invention claimed is:

1. A method of sensing precipitation conditions near a vehicle using a precipitation radar system that includes a transmitter, a receiver, and an electronic control unit, the method comprising:
transmitting electromagnetic radar signals from the transmitter;
receiving reflected radar signals at the receiver;
determining response information from the reflected radar signals for a region of interest, wherein the region of interest is defined at least in part by a range and the response information includes phase data, amplitude data, or both phase and amplitude data based on the reflected radar signals; and
using the response information to determine precipitation conditions for the region of interest, wherein the using the response information includes determining an average dielectric property value for the region of interest and, then, using the average dielectric property value to determine the precipitation conditions for the region of interest, and determining the precipitation conditions includes identifying a precipitation type contained within the region of interest based on mapping the average dielectric property value to the precipitation type.

2. The method of claim 1, wherein the method further comprises the step:
carrying out a responsive vehicle action in response to the determination of the precipitation conditions for the region of interest.

3. The method of claim 1, wherein the average dielectric property value is determined based on the phase data, the amplitude data, or both the phase and amplitude data.

4. The method of claim 1, wherein the using step further includes determining a precipitation density of precipitation within the region of interest.

5. The method of claim 4, wherein the using step further includes determining whether the precipitation type is solid and, when it is determined that the precipitation type is solid, then determining a precipitation thickness of the precipitation within the region of interest.

6. The method of claim 5, wherein the region of interest includes a surface of the vehicle.

7. The method of claim 6, wherein the method further comprises the step of determining a responsive vehicle action based on the precipitation thickness, the precipitation density, or both the precipitation thickness and the precipitation density within the region of interest, and wherein the responsive vehicle action includes a vehicle action to remove the precipitation from the surface of the vehicle.

8. The method of claim 7, wherein the surface of the vehicle is a windshield and wherein the responsive vehicle action includes activating a windshield heater, a windshield defroster, a windshield wiper or a combination thereof.

9. The method of claim 8, wherein the windshield heater, the windshield defroster, the windshield wiper or the combination thereof is activated at a level of operation that is selected based on the precipitation thickness, the precipitation density, or both the precipitation thickness and the precipitation density.

10. The method of claim 1, wherein the determination of response information includes filtering the reflected radar signals based on frequency to obtain frequency- filtered reflected radar signals.

11. The method of claim 10, wherein the determination of response information includes filtering the frequency-filtered reflected radar signals for the region of interest based on time, the range, or both time and the range to obtain the response information for the region of interest.

12. The method of claim 1, wherein the region of interest is external to and spaced away from the vehicle.

13. The method of claim 1, wherein the precipitation radar system is installed on the vehicle behind an opaque surface such that the precipitation radar system is hidden from view.

14. The method of claim 13, wherein the precipitation radar system is installed behind a fascia or bumper of the vehicle or on the roof of the vehicle.

15. The method of claim 1, wherein the method is carried out a plurality of times for a plurality of regions of interest, and wherein the plurality of regions of interest include the region of interest.

16. The method of claim 15, wherein the method includes determining a responsive vehicle action based on determining the precipitation conditions for the plurality of regions of interest.

17. A precipitation radar system for a vehicle, the precipitation radar system comprising:
a transmitter including one or more transmitter antennas;
a receiver including one or more receiver antennas; and
a processor and memory, the memory including computer instructions;
wherein the computer instructions, when executed by the processor, cause the precipitation radar system to:
transmit electromagnetic radar signals from the transmitter using the transmitter antennas;
receive reflected radar signals at the receiver using the receiver antennas;
determine response information from the reflected radar signals for a region of interest, wherein the region of interest is defined at least in part by a range and the response information includes phase data, amplitude data, or both phase and amplitude data based on the reflected radar signals; and
use the response information to determine precipitation conditions for the region of interest, wherein using the response information includes determining an average dielectric property value for the region of interest and, then, using the average dielectric property value to determine the precipitation conditions for the region of interest, and determining the precipitation conditions includes identifying a precipitation type contained within the region of interest based on mapping the average dielectric property value to the precipitation type.

18. The precipitation radar system of claim 17, wherein the precipitation radar system is installed on the vehicle behind an opaque surface such that the precipitation radar system is hidden from view.

* * * * *